July 25, 1972  H. S. WARBERG  3,679,547
ELASTIC SUPPORT GRID FOR NUCLEAR FUEL ELEMENTS
Filed Dec. 16, 1968  3 Sheets-Sheet 1
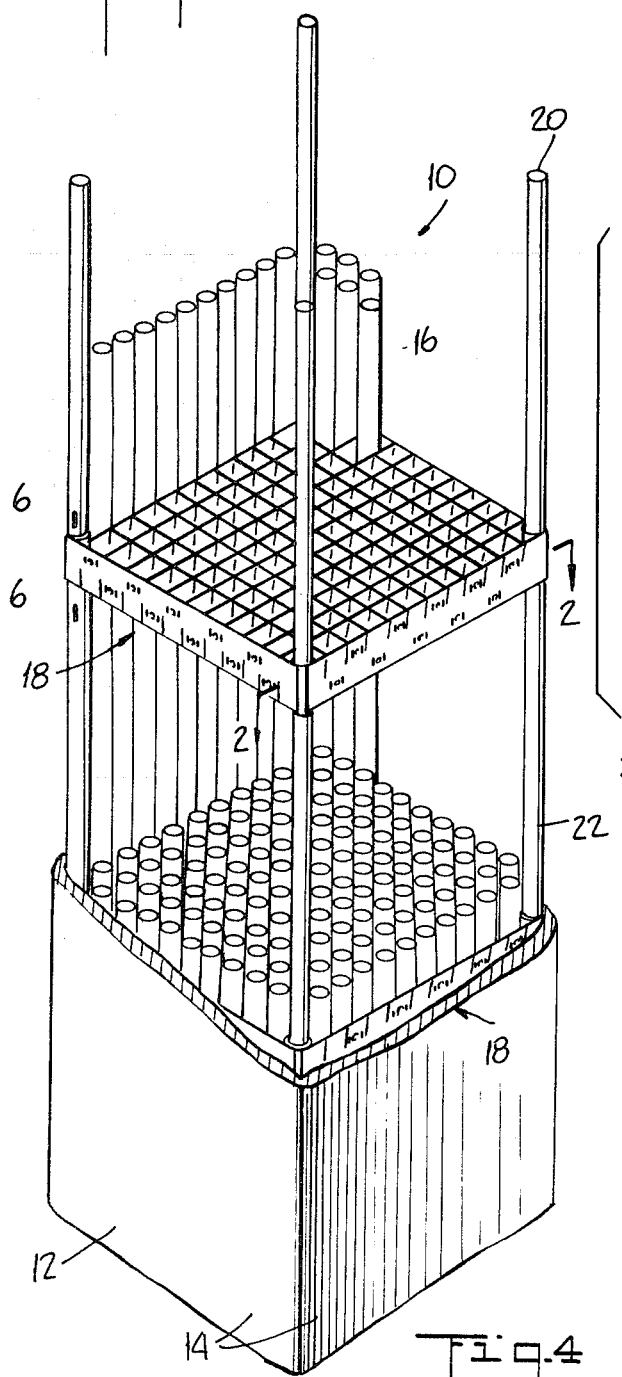
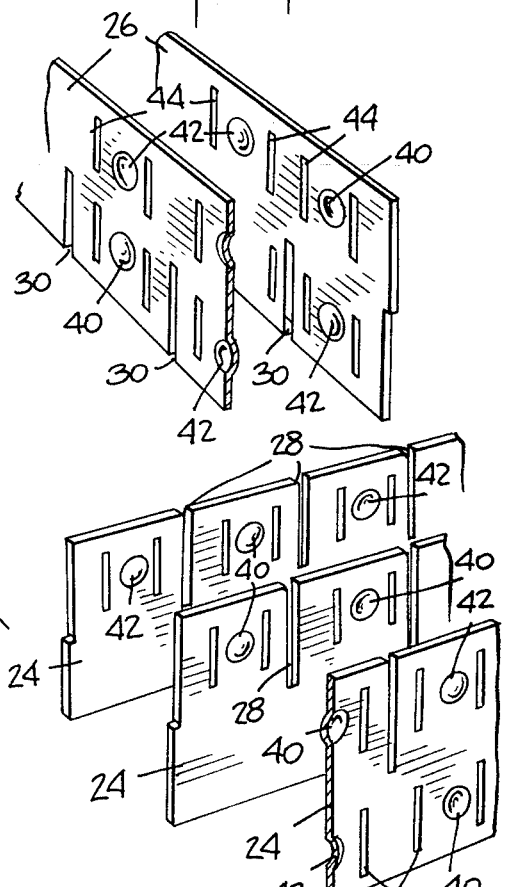
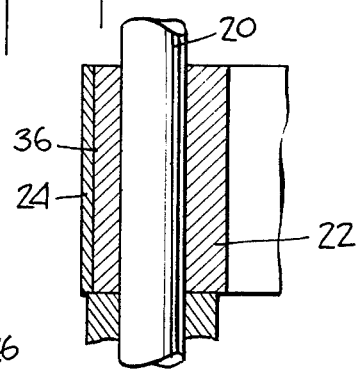
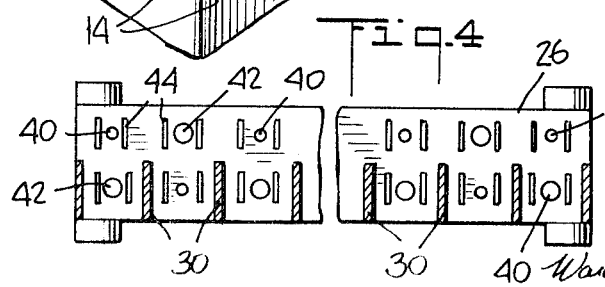
INVENTOR.
HENRIK S. WARBERG
BY
Ward, McElhanney, Brooks & Fitzpatrick
ATTORNEYS

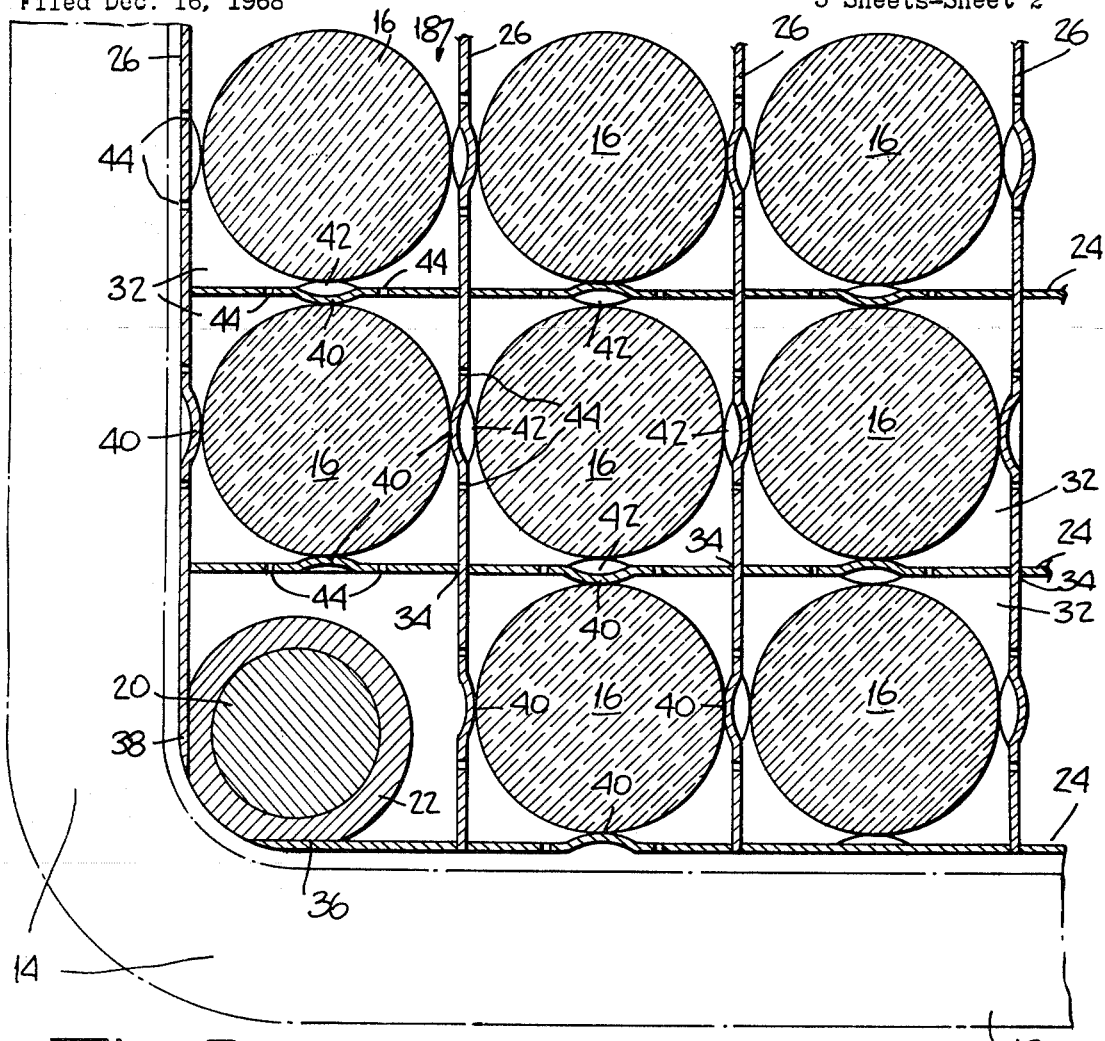
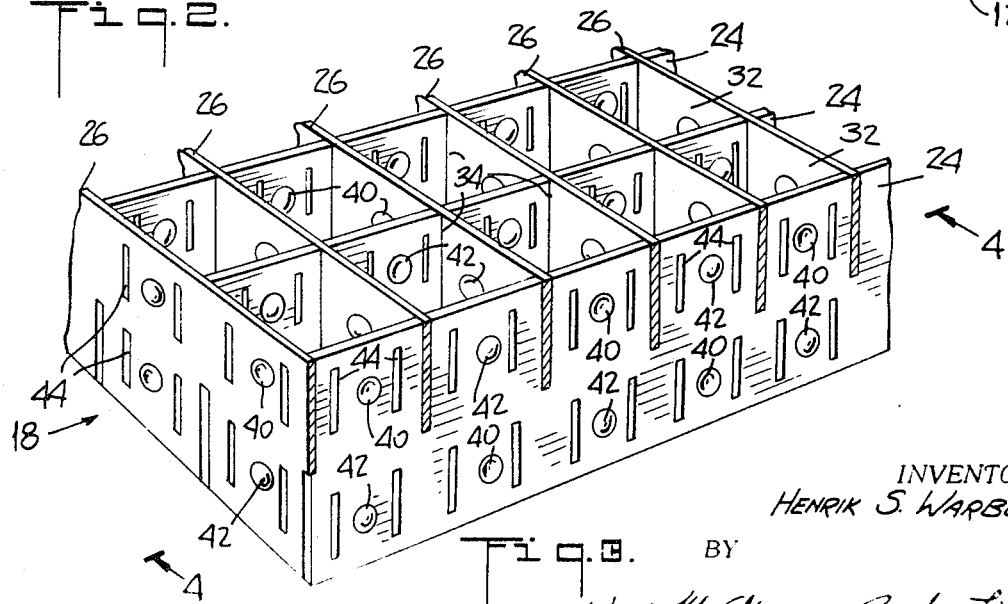

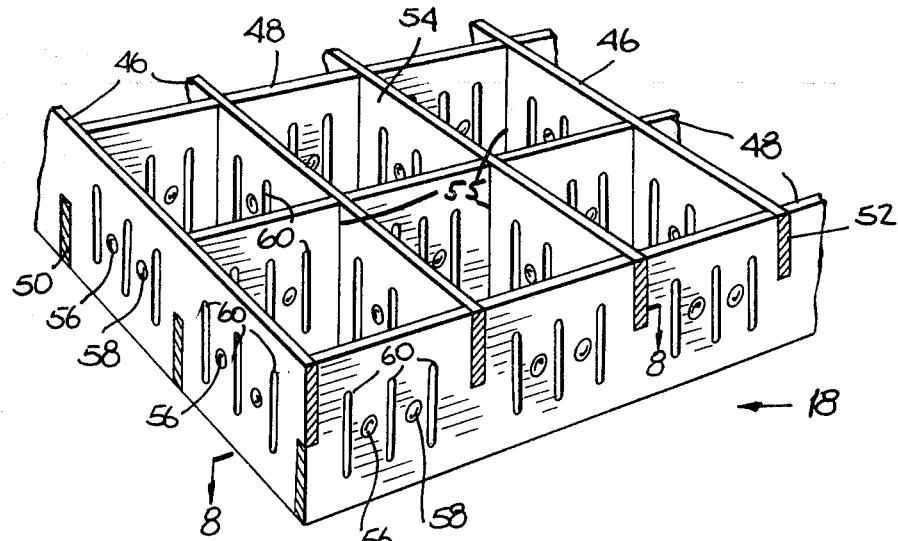
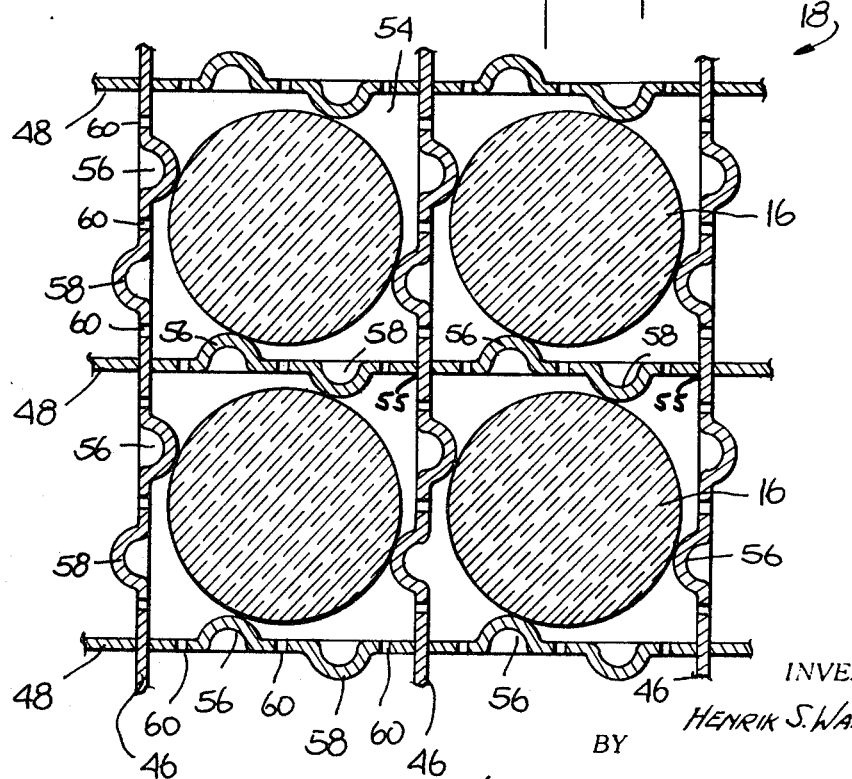

United States Patent Office 3,679,547
Patented July 25, 1972

3,679,547
ELASTIC SUPPORT GRID FOR NUCLEAR FUEL ELEMENTS
Henrik S. Warberg, Dearborn, Mich., assignor to Atomic Power Development Associates, Inc., Detroit, Mich.
Continuation-in-part of application Ser. No. 728,951, May 14, 1968. This application Dec. 16, 1968, Ser. No. 871,462
Int. Cl. G21c *3/34*
U.S. Cl. 176—78                8 Claims

ABSTRACT OF THE DISCLOSURE

A nuclear reactor fuel element assembly which includes a plurality of elongated fuel members contained in a wrapper tube and supported by a plurality of spaced support grids. Each of the support grids includes grid straps which interconnect to form a grid cell for each fuel member, and each cell has one resilient point of support on each of its four walls for supporting its respective fuel member, the points of support of one grid cell being offset with respect to the points of support of the adjacent grid cell.

---

This application is a continuation-in-part application of my copending application Ser. No. 728,951, filed May 14, 1968, now abandoned.

This invention has to do with nuclear reactors and more particularly with fuel element assemblies therefor. The nuclear reactor fuel elements constructed in accordance with my concepts are particularly adapted, among other possible uses, for use in nuclear reactors embodying solid type nuclear fuel.

While many different types of nuclear reactor fuel element assemblies have been successfully used heretofore, my contribution to the art is a new and improved fuel element assembly which is superior to the prior art fuel elements in many respects. Briefly, my invention contemplates the provision of a nuclear reactor fuel element assembly construction wherein a plurality of elongated fuel elements are contained in a wrapper tube and supported by a plurality of spaced support grids. Preferably the support grids are substantially equally spaced one with respect to the next adjacent one, and they serve to retain the fuel elements in spaced, parallel relationship one with respect to the others. Each of the support grids embodies a plurality of grid straps which are interconnected to form a grid cell for each of the fuel members, and preferably the grid cells are rectangular or square in configuration. One resilient point of support is provided on each of the four walls of each grid cell for supporting its respective fuel member. In one form of the invention these resilient points of support are dimples projecting inwardly into each grid cell respectively to centrally hold the fuel member, and a pair of substantially vertically extending slots are disposed one on each side of the dimples respectively. The points of support of one grid cell are offset with respect to the points of support of the adjacent grid cell, respectively. In one form of the invention the dimples of one grid cell are vertically spaced with respect to the dimples of the next adjacent grid cell.

My new and improved construction serves to provide a fuel element assembly which will accommodate fuel pin growth due to irradiation, thermal effects and manufacturing tolerances. By reason of my arrangement, each grid supports all of the pins, thereby reducing the number of supports required as compared to prior art grid supports.

There has thus been outlined rather broadly the more important features of the invention in order that the detailed description thereof that follows may be better understood, and in order that the present contribution to the art may be better appreciated. There are, of course, additional features of the invention that will be described hereinafter which will form the subject of the claims appended hereto. Those skilled in the art will appreciate that the conception on which this disclosure is based may readily be utilized as a basis for the design of other structures for carrying out the several purposes of the invention. It is important, therefore, that the claim be regarded as including such equivalent constructions as do not depart from the spirit and scope of the invention.

Several embodiments of the invention have been chosen for purposes of illustration and description, and are shown in the accompanying drawings, forming a part of the specification, wherein:

FIG. 1 is a fragmentary perspective view of a fuel assembly constructed in accordance with the concept of this invention;

FIG. 2 is an enlarged fragmentary transverse sectional view taken along the line indicated at 2—2 in FIG. 1 and showing the fuel members gripped and secured in position by the grid assembly;

FIG. 3 is an enlarged fragmentary perspective view of one transverse support grid according to the invention;

FIG. 4 is a sectional view taken along the line indicated at 4—4 in FIG. 3, and showing one grid strap;

FIG. 5 is an exploded view showing the means for interconnecting the grid straps;

FIG. 6 is an enlarged sectional view taken along the line indicated at 6—6 in FIG. 1, and showing the corner construction of the fuel element assembly;

FIG. 7 is a fragmentary perspective view of one transverse support grid according to another form of my invention; and FIG. 8 is a fragmentary transverse sectional view taken along the line indicated at 8—8 in FIG. 7, and showing fuel members gripped and secured in position by the grid assembly.

Referring to the drawings in greater detail, as shown in FIGS. 1 and 2, the nuclear reactor fuel element assembly, indicated generally at 10, comprises a wrapper tube 12, which may be rectangular or square in configuration and have side walls 14. Generally, during operation of the nuclear reactor, there is a continuous flow of coolant fluid which enters at the bottom of the assembly and passes upwardly therethrough and is discharged at the top thereof. This coolant serves to carry off the heat energy generated in the fuel elements. It wil be appreciated that adequate cooling of the reactor is essential for its proper functioning. The type of cooling system and coolant vary depending upon the type of reactor selected. In general cooling is effected by circulating the coolant through the core of the reactor and through the fuel assemblies to carry away the heat and limit the operating temperature. Water and liquid sodium have been found to be desirable coolants.

Nuclear fuel employed by a nuclear reactor may take the form of a solid, a liquid, or a slurry mixture, for example. However, the present invention has to do primarily with nuclear fuel in a solid form and more particularly in the shape of rods or pins. Also, the fuel members may take the form of fuel pellets contained in a container or jacket, if desired. In a reactor, the fuel elements may be natural uranium, uranium enriched in U–235 or one of the two man-made fuels including plutonium 239 or uranium 233. It will be appreciated that solid fuels are subjected to severe operating conditions in a nuclear reactor because the heat is primarily generated in the fuel element itself and must be transferred to the cooling medium. The high levels of heat cause severe thermal stresses, and the fission fragments tend to batter or bombard the surrounding materials before they come to rest. Still referring to FIG. 1, the fuel assembly 10 includes a plurality of fuel members 16 which are supported in a generally parallel array, one with respect to the others, by means of a plurality of support grid structures, each being designated generally at 18. It is noted that the support grid structures 18 are each disposed substantially perpendicular to the fuel elements 16 and are in equal spaced relationship one with respect to the next adjacent one. Corner rods 20 are located in each of the four corners of the support grids 18, and tubular sleeves 22, FIGS. 2 and 6, are surmounted on these rods to maintain the spacing of the grids 18.

As best seen in FIGS. 2, 3 and 5, the support grid 18 comprises a plurality of grid straps 24, disposed in parallel relationship one with respect to the others, and a like plurality of grid straps 26 disposed perpendicularly with respect to grid straps 24 and in parallel relationship one with respect to the others. As seen in FIGS. 4 and 5, grid straps 24 are provided with slots 28 and grid straps 26 are provided with slots 30. The first grid straps 24 are interconnected with the second grid straps 26 to form a plurality of grid cells 32, FIGS. 2 and 3, one being provided for each fuel member 16. The straps 24 and 26 may be interlocked and brazed as at 34, FIGS. 2 and 3, for example. The outer grid strap 24 may be brazed to the tubular sleeve 22 as at 36, and the outer grid strap 26 may be brazed to the tubular sleeve 22 as at 38, FIG. 2.

Referring to FIGS. 2 and 3, each of the grid cells 32 has a resilient point of support comprising dimples projecting inwardly into each of the grid cells, respectively. It will be appreciated that the straps 24 and 26 are fabricated from a single laminate of relatively thin sheet material and the dimples 40 project in one direction and the alternate dimples 42 project in the opposite direction. The dimples are centrally disposed on each wall of each grid cell and the dimples of one grid cell are vertically spaced with respect to the dimples of the next adjacent grid cell, thereby to support the fuel element in the center of the grid cells, respectively. By this arrangement, each grid supports all of the fuel elements, thereby reducing the number of grid supports required. A slot 44 is pierced on each side of each dimple so that the dimple support means are rendered resilient or elastic, and hence will accommodate fuel pin growth due to irradiation, thermal effects and manufacturing tolerances.

In the embodiment of the invention illustrated in FIGS. 7 and 8, the support grid structure 18 comprises a plurality of grid straps 46 disposed in parallel relationship one with respect to the others, and a like plurality of grid straps 48 disposed perpendicularly with respect to grid strap 46 and in parallel relationship one with respect to the others. As best seen in FIG. 7, grid straps 46 are provided with slots 50 and grid straps 48 are provided with slots 52. The first grid strap 46 is interconnected with the second grid straps 48 to form a plurality of grid cells 54, FIGS. 6 and 7, one being provided for each fuel member 16. The straps 46 and 48 may be interlocked and brazed as at 55, for example. The outer grid straps may be brazed to the tubular sleeves in the same manner as described hereinbefore in connection with the embodiment of FIGS. 1-6.

Still referring to FIGS. 7 and 8, each of the grid cells 54 has a resilient point of support comprising dimples projecting inwardly into each of the grid cells, respectively. It will be appreciated that straps 46 and 48 are fabricated from a single laminate of relatively thin sheet material and the protruding indentations or dimples 56 project in one direction and the alternate dimples 58 project in the opposite direction. That is, the dimples are offset in one direction on each wall of the grid cell and they are offset in the opposite direction on each wall of the next adjacent grid cell, thereby to support the fuel elements in the center of the grid cells, respectively. Slots 60 are pierced between the dimples and on the outside of each dimple so that the dimple support means are rendered resilient or elastic, and hence will accommodate fuel pin growth due to irradiation, thermal effects and manufacturing tolerances. That is, in each mutual wall between adjacent grid cells there is a first slot, a first dimple projecting in one direction, a second slot, a second dimple projecting in an opposite direction, and a third slot. By this arrangement, each grid supports all the fuel elements, thereby reducing the number of grid supports required. In addition, by reason of this arrangement, the height of each grid support is reduced, and hence the pressure drop in the coolant passing therethrough is reduced.

It will thus be seen that the present invention does indeed provide an improved nuclear reactor fuel assembly which effectively supports each fuel member in proper spaced relationship, which may accommodate uniform and non-uniform fuel element pins, which allows growth of the fuel element pins due to irradiation and differential thermal expansion, which minimizes the number of grids required for adequate support of the individual fuel elements, and which is superior in simplicity, economy and efficiency as compared to such prior art devices.

Although certain particular embodiments of the invention have herein been disclosed for purposes of explanation, various modifications thereof, after study of this specification, will be apparent to those skilled in the art to which the invention pertains and reference should accordingly be had to the appended claims in determining the scope of the invention.

What is claimed and desired to be secured by Letters Patent is:

1. A nuclear reactor fuel element assembly comprising a wrapper tube, a plurality of elongated fuel members, a plurality of support grids disposed in spaced relationship one with respect to the next adjacent one along the length of the fuel members to support said fuel members in paralled spaced relationship one with respect to another within said wrapper tube, each of said support grids comprising a plurality of grid straps interconnected to form a grid cell for each of said fuel members, each of said cells being comprised of four wall portions, each wall portion having two offset dimples lying in a common horizontal line, wherein one dimple projects into said cell and the other dimple projects into an adjacent cell.

2. A nuclear reactor fuel element assembly according to claim 1, further comprising corner rod means disposed in substantially parallel relationship with respect to said elongated fuel elements and in the corners of said wrapper tube.

3. A nuclear reactor fuel element assembly according to claim 1 wherein said grid straps are interconnected to form substantially rectangular grid cells.

4. A nuclear reactor fuel element assembly according to claim 3 wherein said support grids are disposed in equally spaced relationship along the length of the fuel elements, and further comprising elongated rods disposed in each corner of said assembly, and spacing sleeves interposed between support grids to space one grid from the next adjacent grid.

5. A nuclear reactor fuel element assembly according to claim 3 wherein each of said grid cells has slot means disposed adjacent said dimples, respectively.

6. A nuclear reactor fuel element assembly according to claim 3 wherein each of said grid cells has a pair of slots disposed one on each side of said dimples, respectively.

7. A nuclear reactor fuel element assembly according to claim 6 wherein said slots are substantially vertically disposed.

8. A nuclear reactor subassembly comprising a wrapper tube having a substantially square shaped wall portion, a plurality of elongated fuel elements of substantially round cross-section, a plurality of support grids disposed in substantially equally spaced relationship one with respect to the next adjacent one along the longitudinal axes of the fuel members to support said fuel members in parallel, substantially equally spaced relationship one with respect to the other, corner rod means disposed in substantially parallel relationship with respect to said elongated fuel elements and in the corners of said wrapper tube, spacing sleeves interposed between support grids for spacing one grid cell from the next adjacent grid cell, each of said support grids comprising a plurality of grid straps interconnected to form substantially square-shaped grid cells one for each of said fuel elements, each of said cells being comprised of four wall portions, each wall portion having two offset dimples lying in a common horizontal line, wherein one dimple projects into said cell and the other dimple projects into an adjacent cell, each of said grid cells having vertically extending slots disposed adjacent said dimples, respectively, whereby said fuel pin is resiliently medially located within said grid cells respectively.

References Cited

UNITED STATES PATENTS

| | | | |
|---|---|---|---|
| 3,442,763 | 5/1969 | Chetter et al. | 176—78 |
| 3,389,056 | 6/1968 | Frisch | 176—78 |
| 3,510,397 | 5/1970 | Zettervall | 176—78 |
| 3,301,764 | 1/1967 | Timbs et al. | 176—78 |
| 3,398,053 | 8/1968 | Huber et al. | 176—78 |
| 3,255,091 | 6/1966 | Frisch | 176—78 |
| 3,255,090 | 6/1966 | Leirvik | 176—78 X |
| 3,423,287 | 1/1969 | Anthony et al. | 176—78 |
| 3,379,617 | 4/1968 | Andrews et al. | 176—78 |

CARL D. QUARFORTH, Primary Examiner

G. G. SOLYST, Assistant Examiner

U.S. Cl. X.R.

176—76